United States Patent
Singh et al.

(10) Patent No.: US 10,102,042 B2
(45) Date of Patent: Oct. 16, 2018

(54) PRIORITIZING AND DISTRIBUTING WORKLOADS BETWEEN STORAGE RESOURCE CLASSES

(71) Applicants: Ashish Kumar Singh, Hyderabad (IN); Sai Eswar Garapati, Hyderabad (IN); Vijay Kishore Kalakotla, Hyderabad (IN); Pradeep Kumar Das, Hyderabad (IN)

(72) Inventors: Ashish Kumar Singh, Hyderabad (IN); Sai Eswar Garapati, Hyderabad (IN); Vijay Kishore Kalakotla, Hyderabad (IN); Pradeep Kumar Das, Hyderabad (IN)

(73) Assignee: CA, Inc., New York, NY (US)

( * ) Notice: Subject to any disclaimer, the term of this patent is extended or adjusted under 35 U.S.C. 154(b) by 338 days.

(21) Appl. No.: 14/554,430

(22) Filed: Nov. 26, 2014

(65) Prior Publication Data

US 2016/0147575 A1 May 26, 2016

(51) Int. Cl.
G06F 9/46 (2006.01)
G06F 9/50 (2006.01)

(52) U.S. Cl.
CPC .................. *G06F 9/5088* (2013.01)

(58) Field of Classification Search
CPC ..... G06F 9/5088; G06F 9/4856; G06F 9/5011
See application file for complete search history.

(56) References Cited

U.S. PATENT DOCUMENTS

| | | | |
|---|---|---|---|
| 2013/0055248 A1* | 2/2013 | Sokolinski | H04L 67/1097 718/1 |
| 2014/0173616 A1* | 6/2014 | Bird | G06F 9/50 718/104 |
| 2014/0181804 A1* | 6/2014 | Sakata | G06F 9/455 718/1 |
| 2015/0261557 A1* | 9/2015 | Ashok | G06F 9/45558 718/1 |
| 2015/0277762 A1* | 10/2015 | Guo | G06F 3/061 711/154 |
| 2015/0277791 A1* | 10/2015 | Li | G06F 3/0689 711/114 |
| 2015/0301743 A1* | 10/2015 | Nagao | G06F 11/34 711/113 |
| 2016/0085481 A1* | 3/2016 | Antony | G06F 3/0659 718/1 |

* cited by examiner

*Primary Examiner* — James J Lee
(74) *Attorney, Agent, or Firm* — Baker Botts L.L.P.

(57) ABSTRACT

A method includes storing a plurality of workloads in a first disk resource associated with a high end disk classification. The method further includes determining a corresponding activity level for each of the plurality of workloads. The method also includes classifying each of the plurality of workloads into a first set indicative of high-priority workloads and a second set indicative of low-priority workloads based on whether the corresponding activity level is greater than a threshold activity level. The method further includes determining whether a second disk resource associated with a low end disk classification can accommodate storage of a first particular workload in the second set based on an available storage capacity of the second disk resource. The method additionally includes migrating the first particular workload from the first disk resource to the second disk resource.

17 Claims, 6 Drawing Sheets

PRIORITIZING AND DISTRIBUTING WORKLOADS BETWEEN STORAGE RESOURCE CLASSES

BACKGROUND

The disclosure relates generally to prioritizing and distributing workloads, and more specifically, to prioritizing and distributing workloads between storage resources classes.

SUMMARY

According to one embodiment of the disclosure, a method includes storing a plurality of workloads in a first disk resource associated with a high end disk classification. The method further includes determining a corresponding activity level for each of the plurality of workloads. The method also includes classifying each of the plurality of workloads into a first set indicative of high-priority workloads and a second set indicative of low-priority workloads based on whether the corresponding activity level is greater than a threshold activity level. The method further includes determining whether a second disk resource associated with a low end disk classification can accommodate storage of a first particular workload in the second set based on an available storage capacity of the second disk resource. The method additionally includes migrating the first particular workload from the first disk resource to the second disk resource.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
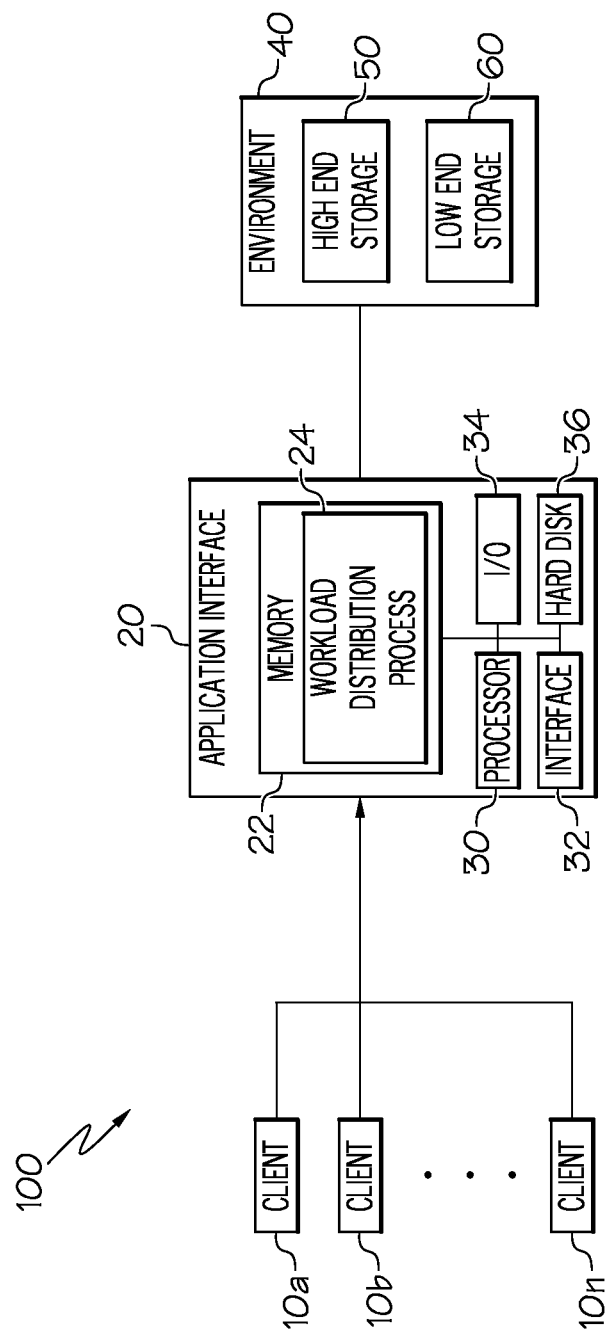
FIG. 1 illustrates a block diagram of a system for prioritizing and distributing workloads between storage resource classes in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Cloud service providers often attempt to improve performance and availability of their solutions. One such area that service providers often attempt to upgrade and/or improve on is cloud storage resource quality. For example, high quality cloud storage resources may provide quicker response time for services, faster provisioning of new applications, faster de-provisioning of published resources, quicker right-sizing and scaling of currently provisioned resources, faster access to stored data, and/or faster execution of applications and tasks. However, next generation high quality storage resources may cost significantly more than lower quality resources. Thus, cloud system administrators may lobby executives for increased budgets and often allocate precious existing monetary resources to upgrading cloud storage resources in the hopes of optimizing performance in the above described areas and improving overall customer, client, or employee experience.

However, certain tasks may not benefit from execution on high quality cloud storage resources. For example, certain tasks may not be as critical for prompt execution. In some cases, this may be because a user is not waiting for the task to complete. Thus, the user may not experience a direct delay due to delayed execution of certain tasks. Current cloud resource management systems may not differentiate between storage types when executing operations.

For example, the current prevailing logic in this area may be that more high quality storage resources added to a cloud solution automatically equates to increased performance of that solution. However, this is not always the case if not enough high quality storage resources are added to the system to execute all requested operations. Performance increases may instead be achieved by differentiating between particular categories of tasks, and distributing execution of those tasks among appropriate storage mechanisms without increasing high quality storage resources.

In accordance with the teachings of the present disclosure, certain tasks and/or processes may be scheduled for execution, or moved during execution, to lower quality storage devices, thus increasing availability of high quality storage devices for execution of critical workloads. Organizations may thus save on infrastructure spending costs to upgrade functional storage resources that are suitable for performing non-critical tasks. Performance may be increased for existing workloads due to decreased competition for system resources. Additional workloads may also be accommodated using the same allocation of high end storage resources.

Historical and current utilization trends may also be utilized to determine optimum allocation between storage resource classes. For example, organizations may keep detailed metrics regarding historical system provisioning tendencies and trends. Such metrics may be utilized to optimize resource allocation between storage resource classes. For example, such metrics may be used to move low priority tasks to low quality storage resources in anticipation of large system provisioning demand, such as at the start of a new project cycle, or the beginning of a work day. Additionally, the decision making processes may adapt to historical and/or current storage utilization trends and changes when scheduling workloads for execution. Further, even current resource constraints may be accounted for when determining whether to move an application from high end storage to low end storage.

Consistency in workload performance may be achieved due to the decreased wait times for users of systems stored in high end storage resources. For example, because resources may be stored more logically according to priority and storage resource quality, more high quality resources may be available without adding any additional high quality storage resources.

With reference to FIG. 1, a system 100 for prioritizing and distributing workloads between storage resource classes is illustrated in accordance with a particular non-limiting embodiment of the present disclosure. System 100 includes clients 10*a-n*, application interface 20, and environment 40. Environment 40 may be a virtualization environment for provisioning and hosting virtual resources such as virtual machines, containers, appliances, and other workloads.

Workloads may refer to any computing task or virtual resource. For example, a request to display a web-page may be a workload. As another example, a virtual machine instance may be a workload. Tasks may refer to operations executed on a workload. For example, a task may include a request to provision a new system (i.e., provision a workload).

Referring back to FIG. 1, clients 10*a-n* may request workloads using application interface 20. Application interface 20 includes memory 22, processor(s) 30, interface 32, I/O 34, and hard disk 36. Processors 30 may be operable to load instructions from hard disk 36 into memory 22 and execute those instructions. For example, processors 30 may execute a workload distribution process 24 in memory 22.

Workload distribution process 24 may receive requests from clients 10*a-n* and allocate workloads among storage resources accordingly. For example, client 10*a* may request provisioning of a new system. Workload distribution process 24 may prioritize the task that client 10*a* is requesting and may provision the corresponding workload among high end storage 50 or low end storage 60 of environment 40 accordingly. In this example, workload distribution process may provision a system (i.e., a workload) and allocate that system to high end storage.

As another example, client 10*b* requests a de-provisioning of a particular resource currently allocated to high end storage 50. Workload distribution process 24 may prioritize the de-provisioning request, and may determine whether low end storage resources are available and may offload the de-provisioning task and the corresponding system workload to the low end storage 60. Low end storage 60 may be associated with lower end performance characteristics. However, no user is awaiting the results of the de-provisioning task. Accordingly, the lower performance characteristics of the low end storage 60 may not affect overall user experience. Further, allocating the de-provisioning task for this workload to low end storage 60 may free up space on high end storage, allowing more high priority tasks for workloads to be accommodated on high end storage 50.

As yet another example, workload distribution process 24 may determine that a particular workload has had no user interaction in over a week. Workload distribution process 24 may utilize historical system utilization metrics or other such metrics to make such a determination. Workload distribution process 24 may thus move this workload from high end storage 50 to low end storage 60 in order to conserve high end storage resources for more frequently executing workloads. Accordingly, more high end storage space may be available to accommodate high priority tasks, such as workloads with more frequent user interactions.

As yet another example, client 10*c* (not illustrated) may interact with a workload stored in low end storage 60. Workload distribution process 24 may determine that the workload has had frequent user interaction and may prioritize this workload. Workload distribution process 24 may determine if high end storage resources are available, and may move the workload from low end storage 60 to high end storage 50. Thus, client 10*c* may automatically experience better performance based on increased current utilization.

Figure 2:
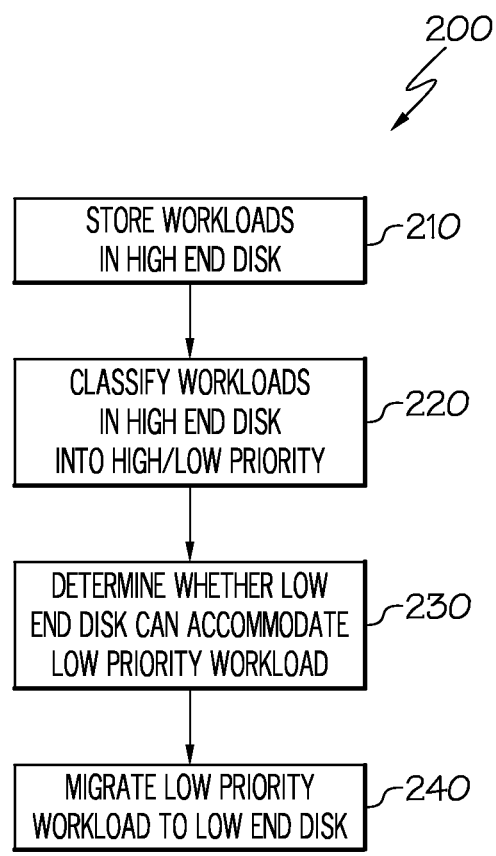
FIG. 2 illustrates a flow chart of a method for prioritizing and distributing workloads between storage resource classes in accordance with a non-limiting embodiment of the present disclosure.

With reference to FIG. 2, a flow chart of a method 200 for prioritizing and distributing workloads between storage resource classes is illustrated in accordance with a non-limiting embodiment of the present disclosure. At step 210, workloads are stored in a high end disk resource. This may result from a provisioning request, some user interaction with a workload, or any number of other reasons.

At step 220, workloads are classified as high/low priority workloads. For example, the workload process 24 of FIG. 1 may periodically utilize available metrics and current utilization patterns to prioritize certain workloads stored in or executing in high end and/or low end storage resources.

At step 230, low end disk resources are evaluated for availability for accommodation of low priority workloads. For example, workload process 24 may evaluate available storage capacity and performance of low end disk resources to determine whether sufficient space exists for storage of low priority workloads.

At step 240, low priority workloads are migrated to low end disk resources. For example, a low priority workload may have experienced infrequent user interaction within a previous set time period. Accordingly this workload may be moved to low end disk resources. As another example, a user may request that a particular workload be de-provisioned. This workload may also be moved to low end disk resources.

In certain embodiments, the teachings of the present disclosure are applicable to virtual machine provisioning and virtual machine usage life-cycle. In one example, virtual machine provisioning requests are directed to high performance storage resources. These virtual machines are then monitored periodically for utilization. If some and/or all of these virtual machines are not used, the system may move the unused resources to low end storage resources.

The system may determine unutilized and/or underutilized virtual machines in high end storage. Such virtual machines are often likely to be deleted or de-provisioned. In one example, the probability of such a virtual machine being deleted before use is as high as about 80%. Thus, migration of these virtual machines may save significant input/output operations on high end storage controllers and thus may increase performance of other resources that can utilize that input/output bandwidth for execution. Performing and/or storing low priority tasks on low end storage may additionally free up storage space on high end storage for additional tasks, workloads and/or virtual machines.

Figure 3:
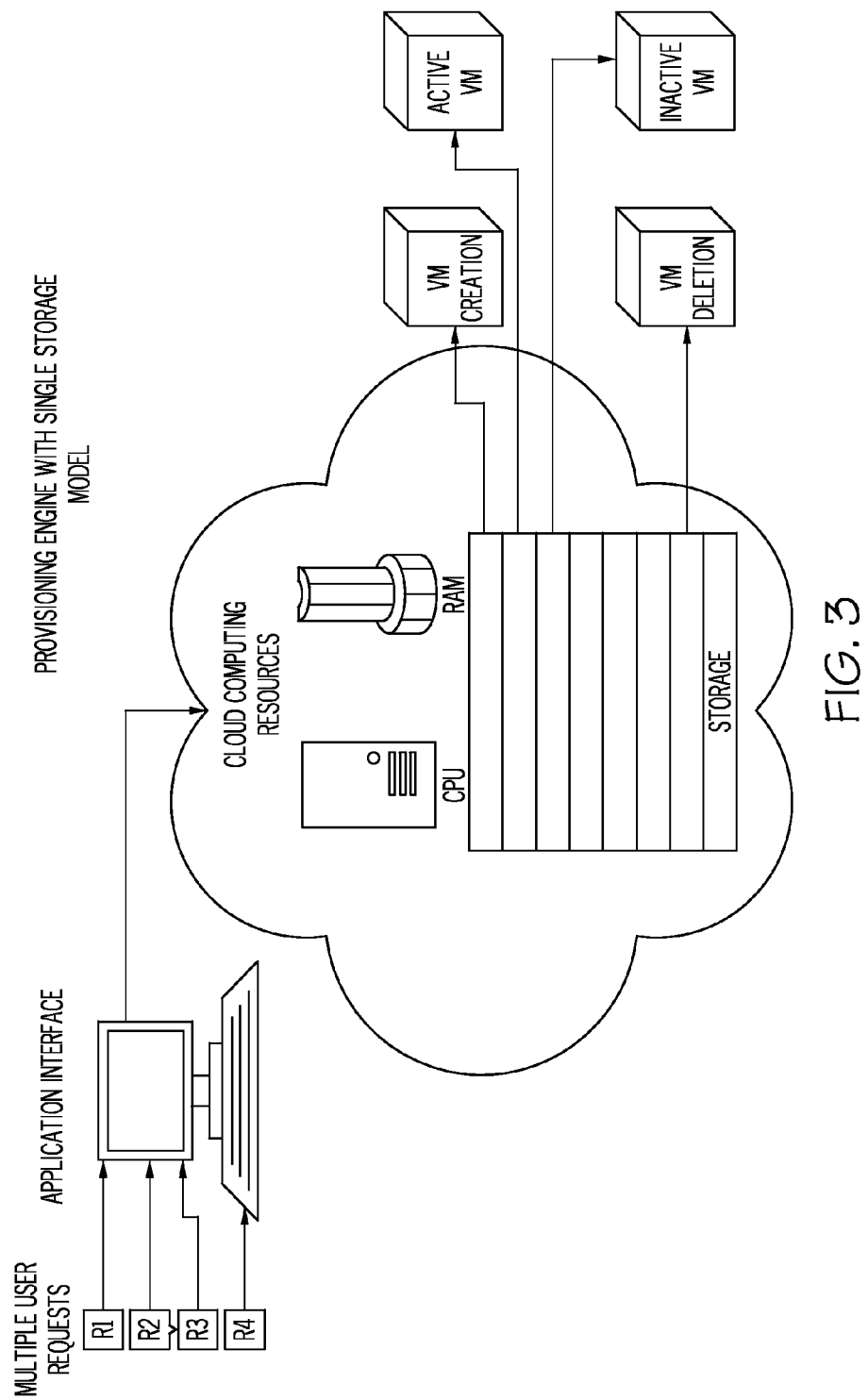
FIG. 3 illustrates an example provisioning engine with a single storage class in accordance with a non-limiting embodiment of the present disclosure.

With reference to FIG. 3, an example provisioning engine with a single storage class. Multiple user requests R1-4 are received at an application interface. Requests R1-4 may correspond to tasks to perform on particular workloads stored in a cloud computing resource. The application interface may allocate the requests R1-4 to processing and memory resources and execute them accordingly. The illustrated system may have a single storage resource classification system, or may not classify storage resources for the purposes of discriminating among storage classes to improve performance. Thus, requests R1-R4 may be executed with the same storage resources notwithstanding the fact that some requests may be lower priority requests. For example, R1 may be a request to delete a virtual machine, while R4 may be a request to execute a critical processing operation on another virtual machine. However, request R1 may utilize valuable high end storage resource even though it is not a high priority task, while R4 may be relegated to whatever storage resources are available. These resources may be only low end storage resources. Thus, in this scenario, the low priority task executes on high end storage resources while the high priority task executes on low end storage resources. This result may be contrary to the desired result, and may be avoided by the teachings of the present disclosure.

Figure 4:
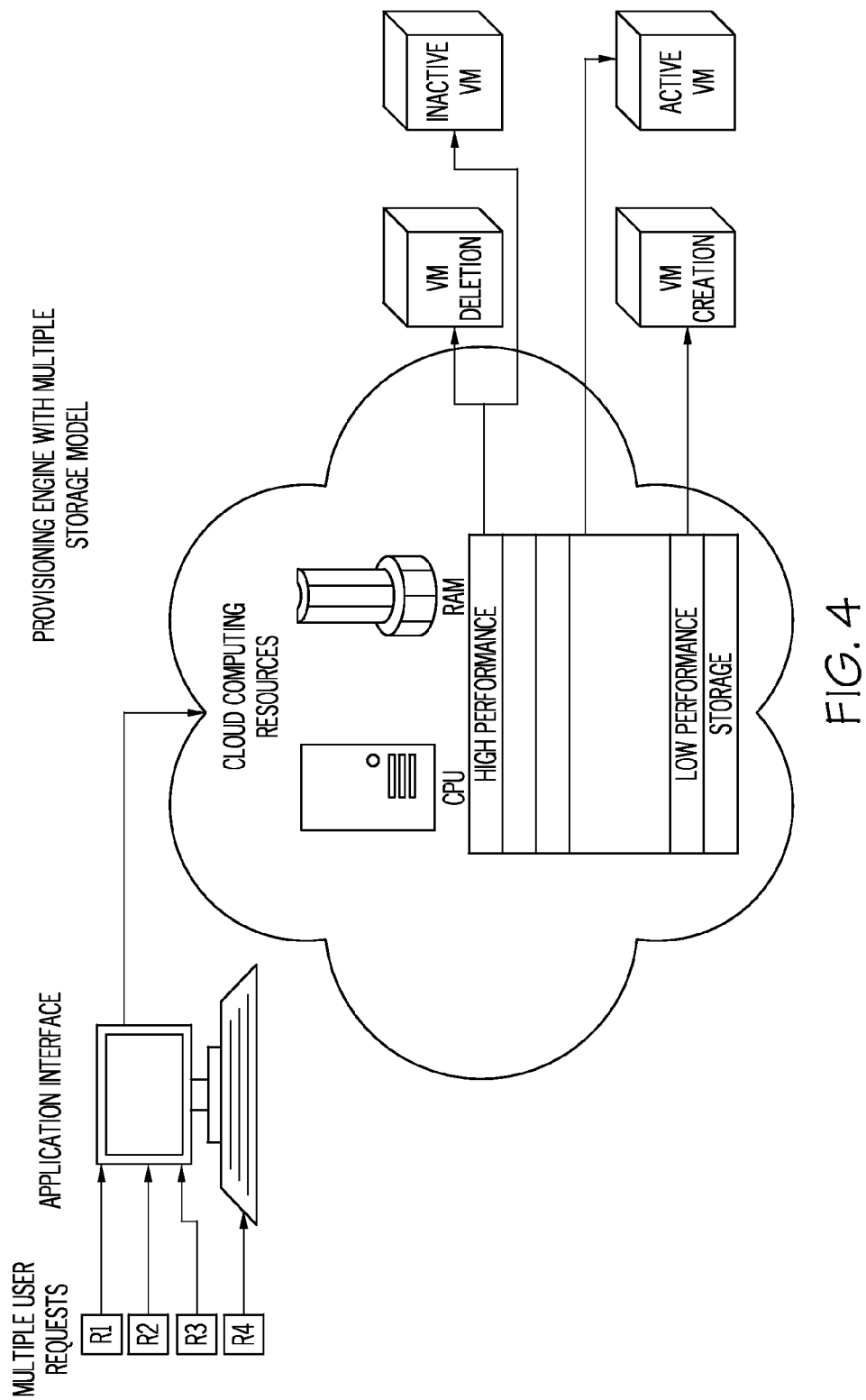
FIG. 4 illustrates an example provisioning engine with multiple storage classes in accordance with a non-limiting embodiment of the present disclosure.

With reference to FIG. 4, an example provisioning engine with multiple storage classes is illustrated in accordance with a non-limiting embodiment of the present disclosure. Multiple user requests R1-4 are received at an application interface. Requests R1-4 may correspond to tasks to perform on particular workloads stored in a cloud computing resource. The application interface may allocate the requests R1-4 to processing and memory resources and execute them accordingly. The illustrated system may have multiple storage resources with varying performance classifications, and the system may discriminate among the storage classes to improve performance. Thus, requests R1-R4 may be executed with the different storage resources according to their priority and other factors such as historical utilization trends, current utilization trends, and other resource metrics. For example, R1 may be a request to delete a virtual machine, while R4 may be a request to execute a critical processing operation on another virtual machine. Thus, request R4 may utilize valuable high end storage resources since it is a high priority task, while R4 may be relegated to whatever storage resources are available, in this case low performance storage resources. Thus, in this scenario, the high priority task/workload executes on/is stored in high end storage resources while the low priority task/workload executes on/is stored in low end storage resources.

Figure 5:
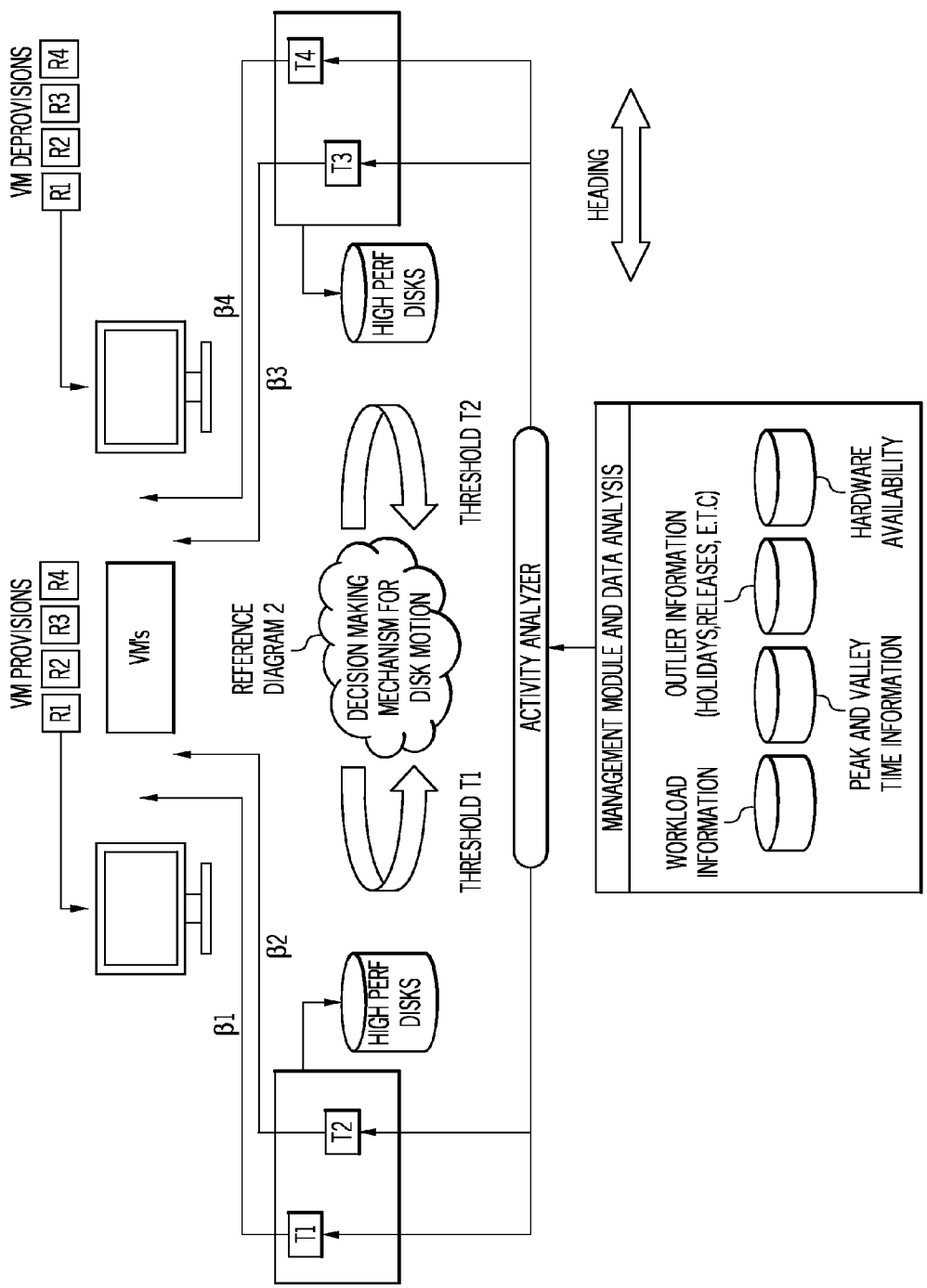
FIG. 5 illustrates a high-level block diagram of a system for prioritizing and distributing workloads between storage resource classes in accordance with a non-limiting embodiment of the present disclosure.

With reference to FIG. 5 a high-level block diagram of a system for prioritizing and distributing workloads between storage resource classes is illustrated in accordance with a non-limiting embodiment of the present disclosure. The system includes a decision making mechanism for disk motion with several thresholds T1 and T2, and an activity analyzer that analyzes management data. Management data includes workload information, peak and valley time information, outlier information (e.g., holidays, release dates, etc.) and hardware availability. The system additionally includes high performance and low performance disk resources executing tasks/workloads T1-4. The illustrated activity analyzer may analyze management data in prioritizing tasks and workloads for allocation among disk resources. One example implementation of the decision making mechanism/logic is described in more detail in FIG. 6.

Figure 6:
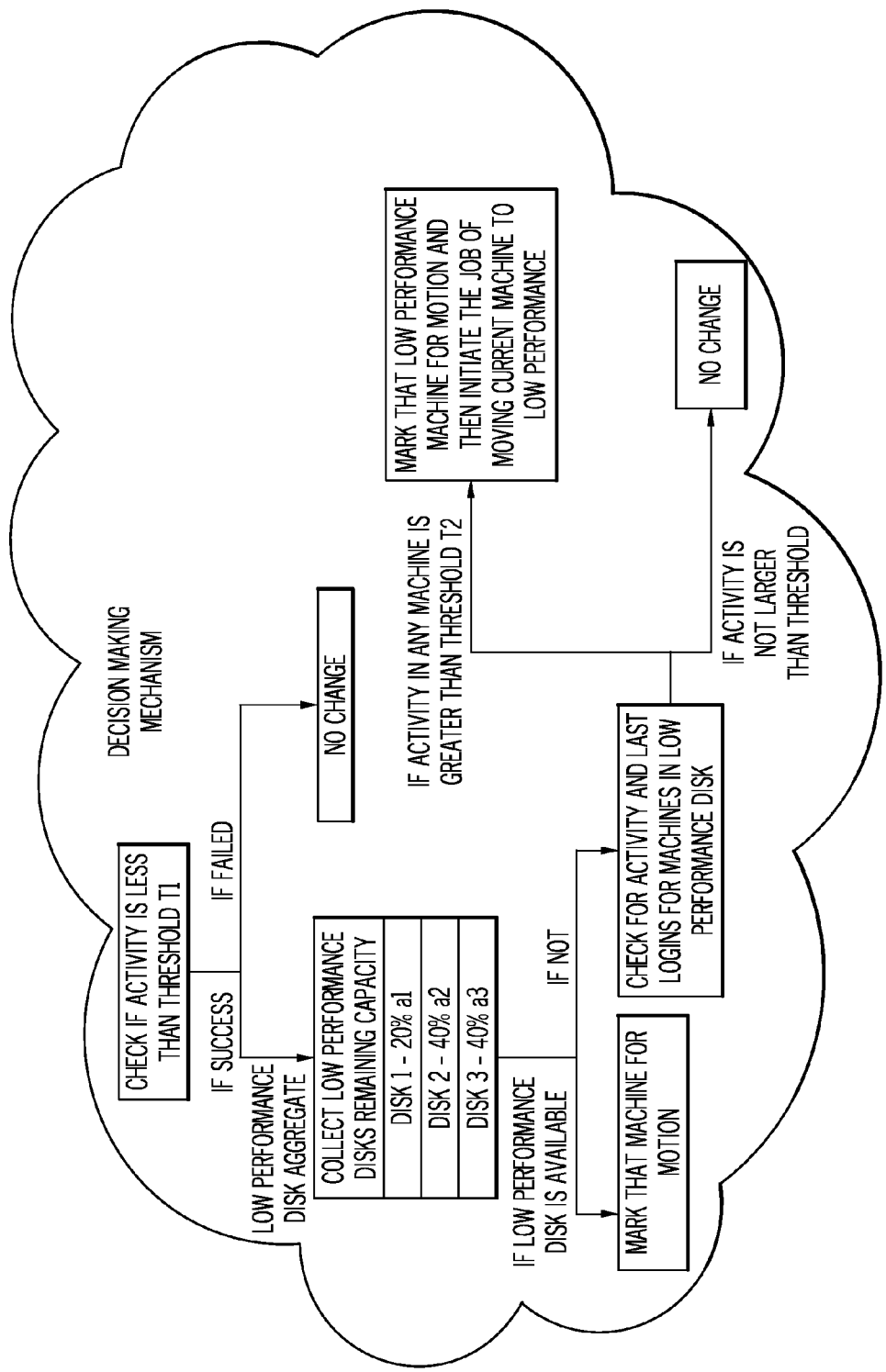
FIG. 6 illustrates a flow chart of logic within a decision making mechanism in a system for prioritizing and distributing workloads between storage resource classes in accordance with a non-limiting embodiment of the present disclosure.

With reference to FIG. 6, a flow chart of logic within a decision making mechanism in a system for prioritizing and distributing workloads between storage resource classes is illustrated in accordance with a non-limiting embodiment of the present disclosure. The decision making mechanism begins by checking if activity for a particular workload is less than a threshold, such as threshold T1 from FIG. 5. If the activity for that workload is greater than T1, then no further action is taken for that workload. That is to say, the workload continues to be stored in high end disk resources.

However, if the activity for that workload is less than T1, then low performance disk is surveyed. For example, low performance disk remaining capacity may be determined. If low performance disk space is available, then that workload is marked for transfer to lower performance storage resources. A disk controller may subsequently move the memory space corresponding to the workload to low performance storage resources.

If low performance disk is not available, then activity, such as last login or user interaction time, for each workload in the low performance disk resources is determined. If activity in a workload stored in low performance disk is not larger than, for example, threshold T2 from FIG. 5, then no workloads are transferred between disk resources. However, if activity in any workload stored in low performance disk is, for example, greater than threshold T2 from FIG. 5, then that workload is flagged for transfer to high performance disk resources. In certain embodiments, workload transfer may be initiated at this time.

The teachings of the present disclosure may attempt to decrease organizational expenditures on upgrading infrastructure to high quality storage. As compared to upgrading or adding additional high quality storage resources or devices, as good and/or better performance may be experienced by prioritizing and distributing workloads to appropriate storage resources.

Additionally, performance issues and system failures may be reduced. For example, multiple jobs competing for execution on the same storage mechanism may decrease performance and lead to increased system failures, even though the particular storage mechanism may be high quality. Prioritizing and distributing these competing workloads may decrease performance issues and system failures due to an under-supply of high quality storage resources.

Further, input/output ("I/O") operations on storage controllers may be reduced by distributing workloads across multiple storage resources and controllers. Utilization of high end storage resources may also be improved without presenting any workflow changes to end users. The logic for performing these operations may be performed at the application layer and may be hidden from users.

Organizations may save capital by rationally purchasing high end storage infrastructure components. In certain embodiments, reports may be generated that may guide system administrators as to whether to increase high end storage, increase low end storage, or other system infrastructure resource suggestions. For example, if a large number of operations are suitable for allocation to low end storage, the system may suggest increasing low end storage resources. Such a recommendation may enable significant savings because of the insights provided. For example, without such a system, an administrator may increase high-end storage at a great expense. The administrator may mistake the performance lag as a deficiency in the high end storage. While increasing high end storage may solve this particular problem in this instance, the lower cost method would be to differentiate between workload tasks and execute certain workloads on existing low end storage. Alternatively, additional low end storage may be purchased at a lower cost than high end storage. Accordingly, cloud service provider profits may be maximized.

In certain embodiments, active virtual machines may be migrated to high performance storage and unused virtual machines may be migrated to low end storage for eventual de-provisioning.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining an activity level of each of a plurality of virtual machine instances executing a plurality of workloads, wherein each of the plurality of virtual machine instances are executing on a high cost disk resource, and wherein each of the workloads are in use;
   classifying each of the plurality of workloads into a set of high-priority workloads or a set of low-priority workloads based on (a) comparing the corresponding activity level to a threshold activity level and (b) whether the workload is associated with a non-critical task;
   determining, based on the classification, a new allocation of each of the plurality of workloads between the high cost disk resource and the low cost disk resource to accommodate an expected system provisioning event on the high cost disk resource wherein, for each workload in the set of low-priority workloads, it is determined whether the low cost disk resource can accommodate storage of the workload based on an available storage capacity of the low cost disk resource; and
   migrating workloads from the high cost disk resource to the low cost disk resource according to the new allocation.

2. The method of claim 1, further comprising:
   determining that the low cost disk resource cannot accommodate storage of the first particular workload;
   classifying each of a plurality of workloads executing on the low cost disk resource into the high-priority set and the low-priority set based on whether a corresponding activity level for each of the plurality of workloads executing on the low cost disk resource is greater than a second threshold activity level; and
   migrating a first particular workload in the high priority set from the low cost disk resource to the high cost disk resource.

3. The method of claim 1, further comprising:
   receiving a request to execute an operation associated with a second particular workload;
   determining whether the operation is associated with any high priority operations;
   if the operation is associated with a high priority operation, storing the second particular workload in the high cost disk resource; and
   if the operation is not associated with any high priority operations, storing the second particular workload in the low cost disk resource.

4. The method of claim 1, further comprising:
   receiving a request to provision a new virtual machine instance;
   determining that the request is associated with a high priority operation; and
   in response to determining that the request is associated with a high priority operation, storing the new virtual machine instance in the high cost disk resource.

5. The method of claim 1, further comprising:
   receiving a request to delete an existing virtual machine instance stored in the high cost disk resource;
   determining that the request is not associated with any high priority operations; and
   in response to determining that the request is not associated with any high priority operations, migrating the existing virtual machine instance to the low cost disk resource.

6. The method of claim 1, wherein classifying each of the plurality of workloads is further based on historical usage information.

7. A computer configured to access a storage device, the computer comprising:
   a processor; and
   a non-transitory, computer-readable storage medium storing computer-readable instructions that when executed by the processor cause the computer to perform:
      determining an activity level of each of a plurality of virtual machine instances executing a plurality of workloads, wherein each of the plurality of virtual machine instances executing on a high cost disk resource, and wherein each of the workloads are in use;
      classifying each of the plurality of workloads into a set of high-priority workloads or a set of low-priority workloads based on (a) comparing the corresponding activity level to a threshold activity level and (b) whether the workload is associated with a non-critical task;
      determining whether a low cost disk resource can accommodate storage of a first particular workload in the low-priority set based on an available storage capacity of the low cost disk resource;
      determining, based on the classification, a new allocation of each of the plurality of workloads between the high cost disk resource and the low cost disk resource to accommodate an expected system provisioning event on the high cost disk resource wherein, for each workload in the set of low-priority workloads, it is determined whether the low cost disk resource can accommodate storage of the workload based on an available storage capacity of the low cost disk resource; and
      migrating workloads from the high cost disk resource to the low cost disk resource according to the new allocation.

8. The computer of claim 7, wherein the computer-readable instructions further cause the computer to perform:
   determining that the low cost disk resource cannot accommodate storage of the first particular workload;
   classifying each of a plurality of workloads executing on the low cost disk resource into the high-priority set and the low-priority set based on whether a corresponding activity level for each of the plurality of workloads executing on the low cost disk resource is greater than a second threshold activity level; and
   migrating a first particular workload in the high priority set from the low cost disk resource to the high cost disk resource.

9. The computer of claim 7, wherein the computer-readable instructions further cause the computer to perform:
   receiving a request to execute an operation associated with a second particular workload;
   determining whether the operation is associated with any high priority operations;
   if the operation is associated with a high priority operation, storing the second particular workload in the high cost disk resource; and
   if the operation is not associated with any high priority operations, storing the second particular workload in the low cost disk resource.

10. The computer of claim 7, wherein the computer-readable instructions further cause the computer to perform:
  receiving a request to provision a new virtual machine instance;
  determining that the request is associated with a high priority operation; and
  in response to determining that the request is associated with a high priority operation, storing the new virtual machine instance in the high cost disk resource.

11. The computer of claim 7, wherein the computer-readable instructions further cause the computer to perform:
  receiving a request to delete an existing virtual machine instance stored in the high cost disk resource;
  determining that the request is not associated with any high priority operations; and
  in response to determining that the request is not associated with any high priority operations, migrating the existing virtual machine instance to the low cost disk resource.

12. The computer of claim 7, wherein classifying each of the plurality of workloads is further based on historical usage information.

13. A computer program product comprising:
  a non-transitory computer-readable storage medium having computer-readable program code embodied therewith, the computer-readable program code comprising:
    computer-readable program code configured to determine an activity level of each of a plurality of virtual machine instances executing a plurality of workloads, wherein each of the plurality of virtual machine instances are executing on a high cost disk resource, and wherein each of the workloads are in use;
    computer-readable program code configured to classify each of the plurality of workloads into a set of high-priority workloads or a set of low-priority workloads based on (a) comparing the corresponding activity level to a threshold activity level and (b) whether the workload is associated with a non-critical task;
    computer-readable program code configured to determine whether a low cost disk resource can accommodate storage of a first particular workload in the low-priority set based on an available storage capacity of the low cost disk resource;
    computer-readable program code configured to determine, based on the classification, a new allocation of each of the plurality of workloads between the high cost disk resource and the low cost disk resource to accommodate an expected system provisioning event on the high cost disk resource wherein, for each workload in the set of low-priority workloads, it is determined whether the low cost disk resource can accommodate storage of the workload based on an available storage capacity of the low cost disk resource; and
    computer-readable program code configured to migrate workloads from the high cost disk resource to the low cost disk resource according to the new allocation.

14. The computer program product of claim 13, wherein the computer-readable program code further comprises:
  computer-readable program code configured to determine that the low cost disk resource cannot accommodate storage of the first particular workload;
  computer-readable program code configured to classify each of a plurality of workloads executing on the low cost disk resource into the high-priority set and the low-priority set based on whether a corresponding activity level for each of the plurality of workloads executing on the low cost disk resource is greater than a second threshold activity level; and
  computer-readable program code configured to migrate a first particular workload in the high-priority set from the low cost disk resource to the high cost disk resource.

15. The computer program product of claim 13, wherein the computer-readable program code further comprises:
  computer-readable program code configured to receive a request to execute an operation associated with a second particular workload;
  computer-readable program code configured to determine whether the operation is associated with any high priority operations;
  computer-readable program code configured to, if the operation is associated with one a high priority operation, store the second particular workload in the high cost disk resource; and
  computer-readable program code configured to, if the operation is not associated with any high priority operations, store the second particular workload in the low cost disk resource.

16. The computer program product of claim 13, wherein the computer-readable program code further comprises:
  computer-readable program code configured to receive a request to provision a new virtual machine instance;
  computer-readable program code configured to determine that the request is associated with a high priority operation; and
  computer-readable program code configured to, in response to determining that the request is associated with a high priority operation, store the new virtual machine instance in the high cost disk resource.

17. The computer program product of claim 13, wherein the computer-readable program code further comprises:
  computer-readable program code configured to receive a request to delete an existing virtual machine instance stored in the high cost disk resource;
  computer-readable program code configured to determine that the request is not associated with any high priority operations; and
  computer-readable program code configured to, in response to determining that the request is not associated with any high priority operations, migrate the existing virtual machine instance to the low cost disk resource.

* * * * *